US012143304B2

(12) United States Patent
Chitalia et al.

(10) Patent No.: US 12,143,304 B2
(45) Date of Patent: *Nov. 12, 2024

(54) UNDERLAY-OVERLAY CORRELATION

(71) Applicant: Juniper Networks, Inc., Sunnyvale, CA (US)

(72) Inventors: Harshit Naresh Chitalia, Mountain View, CA (US); Anuja More, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 779 days.

This patent is subject to a terminal disclaimer.

(21) Appl. No.: 17/248,940

(22) Filed: Feb. 12, 2021

(65) Prior Publication Data

US 2021/0168085 A1 Jun. 3, 2021

Related U.S. Application Data

(63) Continuation of application No. 16/541,947, filed on Aug. 15, 2019, now Pat. No. 10,924,419.

(51) Int. Cl.
*H04L 47/2483* (2022.01)
*G06F 9/455* (2018.01)
(Continued)

(52) U.S. Cl.
CPC ...... *H04L 47/2483* (2013.01); *G06F 9/45558* (2013.01); *H04L 45/586* (2013.01);
(Continued)

(58) Field of Classification Search
CPC ... H04L 47/2483; H04L 45/586; H04L 45/64; H04L 47/125; G06F 9/45558
See application file for complete search history.

(56) References Cited

U.S. PATENT DOCUMENTS 7,475,130 B2 1/2009 Silverman
8,010,469 B2 8/2011 Kapoor et al.
(Continued)

FOREIGN PATENT DOCUMENTS

CN 1794651 A 6/2006
CN 101141401 A 3/2008
(Continued)

OTHER PUBLICATIONS

Response to Extended Search Report dated Mar. 4, 2020, from counterpart European Application No. 19207335.1, filed Aug. 17, 2021, 15 pp.
(Continued)

*Primary Examiner* — Ronald B Abelson
(74) *Attorney, Agent, or Firm* — Shumaker & Sieffert, P.A.

(57) ABSTRACT

This disclosure describes techniques that include collecting underlay flow data along with overlay flow data within a network and correlating the data to enable insights into network operation and performance. In one example, this disclosure describes a method that includes collecting flow data for a network having a plurality of network devices and a plurality of virtual networks established within the network; storing the flow data in a data store; receiving a request for information about a data flow, wherein the request for information specifies a source virtual network for the data flow and further specifies a destination virtual network for the data flow; and querying the data store with the specified source virtual network and the specified destination virtual network to identify, based on the stored flow data, one or more network devices that have processed at least one packet in the data flow.

18 Claims, 6 Drawing Sheets

(51) Int. Cl.
  *H04L 45/586* (2022.01)
  *H04L 45/64* (2022.01)
  *H04L 47/125* (2022.01)
(52) U.S. Cl.
  CPC ............ *H04L 45/64* (2013.01); *H04L 47/125* (2013.01); *G06F 2009/45595* (2013.01)

(56) References Cited

U.S. PATENT DOCUMENTS

| | | | |
|---|---|---|---|
| 8,077,732 | B2 | 12/2011 | Voit et al. |
| 8,750,288 | B2 | 6/2014 | Nakil et al. |
| D715,313 | S | 10/2014 | Hontz, Jr. |
| 8,943,441 | B1 | 1/2015 | Patrick et al. |
| 8,966,027 | B1 | 2/2015 | Brandwine et al. |
| D743,412 | S | 11/2015 | Danielyan et al. |
| 9,276,838 | B2 | 3/2016 | Lee et al. |
| D759,076 | S | 6/2016 | Bain |
| 9,371,004 | B2 | 6/2016 | Wehrman et al. |
| D766,948 | S | 9/2016 | Gebauer et al. |
| 9,531,566 | B2 | 12/2016 | Ishii |
| 9,569,232 | B1 | 2/2017 | Brandwine et al. |
| D781,302 | S | 3/2017 | Baguley et al. |
| D787,556 | S | 5/2017 | Gaur |
| D801,390 | S | 10/2017 | Park |
| 9,838,316 | B2 | 12/2017 | Hegde et al. |
| D810,121 | S | 2/2018 | McClellan |
| D820,297 | S | 6/2018 | Gardner et al. |
| 10,116,559 | B2 | 10/2018 | Kapadia et al. |
| D834,039 | S | 11/2018 | Einspahr et al. |
| 10,158,545 | B1 | 12/2018 | Marrone et al. |
| D847,178 | S | 4/2019 | Kato et al. |
| D847,201 | S | 4/2019 | Thiel et al. |
| D872,121 | S | 1/2020 | Einspahr et al. |
| 10,547,521 | B1 | 1/2020 | Roy et al. |
| D883,997 | S | 5/2020 | Einspahr et al. |
| D884,726 | S | 5/2020 | Regev et al. |
| D886,834 | S | 6/2020 | Chitalia et al. |
| 10,673,714 | B1 | 6/2020 | Chitalia et al. |
| 10,728,121 | B1 | 7/2020 | Chitalia |
| D902,229 | S | 11/2020 | Chitalia et al. |
| 10,855,604 | B2 | 12/2020 | Tigli |
| 10,924,419 | B1 | 2/2021 | Chitalia et al. |
| D916,828 | S | 4/2021 | Daie et al. |
| D916,831 | S | 4/2021 | Daie et al. |
| 10,999,142 | B1 | 5/2021 | Mandal et al. |
| 11,206,200 | B1 | 12/2021 | Chitalia et al. |
| D946,615 | S | 3/2022 | Einspahr et al. |
| 11,277,315 | B2 | 3/2022 | Patel et al. |
| 11,316,763 | B1 | 4/2022 | Chitalia et al. |
| 2009/0168648 | A1 | 7/2009 | Labovitz et al. |
| 2009/0217175 | A1 | 8/2009 | Bechtel et al. |
| 2009/0276771 | A1 | 11/2009 | Nickolov et al. |
| 2012/0026914 | A1 | 2/2012 | Banerjee et al. |
| 2012/0144317 | A1 | 6/2012 | Balasubramanian |
| 2013/0074008 | A1 | 3/2013 | Umezawa |
| 2013/0212507 | A1 | 8/2013 | Fedoseyeva et al. |
| 2013/0332601 | A1 | 12/2013 | Nakil et al. |
| 2013/0346592 | A1 | 12/2013 | Kamble et al. |
| 2015/0052441 | A1 | 2/2015 | Degionanni |
| 2015/0058179 | A1 | 2/2015 | Pu |
| 2015/0244617 | A1 | 8/2015 | Nakil et al. |
| 2015/0256413 | A1 | 9/2015 | Du et al. |
| 2015/0331597 | A1 | 11/2015 | Ng |
| 2015/0350084 | A1 | 12/2015 | DeCusatis et al. |
| 2016/0105471 | A1 | 4/2016 | Nunes et al. |
| 2017/0272359 | A1 | 9/2017 | Behringer et al. |
| 2017/0288945 | A1 | 10/2017 | Chandangoudar |
| 2017/0302572 | A1 | 10/2017 | Izhak-Ratzin |
| 2018/0191767 | A1 | 7/2018 | Habib et al. |
| 2018/0219765 | A1 | 8/2018 | Michael et al. |
| 2018/0262594 | A1 | 9/2018 | Nhu et al. |
| 2018/0287902 | A1 | 10/2018 | Chitalia et al. |
| 2018/0329794 | A1 | 11/2018 | Prieto et al. |
| 2019/0058649 | A1* | 2/2019 | Qi ........................ H04L 43/065 |
| 2019/0089742 | A1 | 3/2019 | Hill |
| 2019/0109757 | A1 | 4/2019 | Oliveira |
| 2019/0149411 | A1 | 5/2019 | Rewaskar et al. |
| 2019/0312813 | A1 | 10/2019 | Ellis et al. |
| 2020/0021514 | A1 | 1/2020 | Michael et al. |
| 2020/0112510 | A1 | 4/2020 | Kapoor et al. |
| 2020/0344143 | A1 | 10/2020 | K et al. |
| 2020/0366578 | A1 | 11/2020 | Punj et al. |
| 2021/0264523 | A1 | 8/2021 | Schuster |
| 2021/0328891 | A1 | 10/2021 | Cherkas |
| 2022/0014451 | A1 | 1/2022 | Naik |

FOREIGN PATENT DOCUMENTS

| | | |
|---|---|---|
| CN | 101310486 A | 11/2008 |
| CN | 102271084 A | 12/2011 |
| CN | 102801618 A | 11/2012 |
| CN | 103081415 A | 5/2013 |
| CN | 103501280 A | 1/2014 |
| CN | 104521196 A | 4/2015 |
| CN | 104639372 A | 5/2015 |
| CN | 104685838 A | 6/2015 |
| CN | 105262615 A | 1/2016 |
| CN | 105430037 A | 3/2016 |
| CN | 105939260 A | 9/2016 |
| CN | 106301963 A | 1/2017 |
| CN | 107077372 A | 8/2017 |
| CN | 107094090 A | 8/2017 |
| CN | 107646185 A | 1/2018 |
| CN | 109391517 A | 2/2019 |
| CN | 110851549 A | 2/2020 |
| EP | 3226471 A1 | 7/2016 |
| EP | 3382546 A1 | 10/2018 |
| EP | 3382959 A2 | 10/2018 |
| WO | 2016069382 A1 | 5/2016 |
| WO | 2019135249 A1 | 7/2019 |

OTHER PUBLICATIONS

Extended Search Report from counterpart European Application No. 19207335.1, dated Mar. 4, 2020, 10 pp.
U.S. Appl. No. 16/917,690, filed Jun. 30, 2020 entitled "Application Flow Monitoring", Juniper Networks, Inc.
U.S. Appl. No. 16/922,915, filed Jul. 7, 2020 entitled "System and Method for Determining a Data Flow Path in an Overlay Network", Juniper Networks, Inc.
U.S. Appl. No. 16/922,963, filed Jul. 7, 2020 entitled "System and Method for Determining a Data Flow Path in an Overlay Network", Juniper Networks, Inc.
U.S. Appl. No. 16/917,641, filed Jun. 30, 2020, naming inventors Mandal et al.
Notice of Allowance from U.S. Appl. No. 16/541,947, mailed Oct. 20, 2020, 20 pp.
U.S. Appl. No. 29/652,529, filed Sep. 11, 2020, naming inventors Naik et al.
Office Action from U.S. Appl. No. 16/922,963, dated Nov. 17, 2021, 16 pp.
Office Action from U.S. Appl. No. 29/652,529, dated Nov. 15, 2021, 6 pp.
Response to Office Action dated Nov. 15, 2021, from U.S. Appl. No. 29/652,529, filed Feb. 4, 2022, 7 pp.
Response to Office Action dated Nov. 17, 2021 from U.S. Appl. No. 16/922,963, filed Feb. 14, 2022, 14 pp.
"SFlow," Wikipedia, Sep. 2, 2019, 4 pp.
Krishnan et al., "Analysis of Data Center SDN Controller Architectures: Technology and Business Impacts," International Conference on Computing, Networking and Communications, Cloud Computing and Big Data, Feb. 2015, 6 pp.
U.S. Appl. No. 17/301,374, filed Mar. 31, 2021, naming inventors Mandal et al.
Hofstede et al., "Flow Monitoring Explained: From Packet Capture to Data Analysis With NetFlow and IPFIX," IEEE Communications Surveys & Tutorials 16(4), Apr. 2014, pp. 2037-2064.
Chen et al., "A new pattern of network layer data transmission", IEEE International Conference on Network Infrastructure and Digital Content, IEEE, Nov. 6, 2009, pp. 576-580.

(56) References Cited

OTHER PUBLICATIONS

Response to Ex Parte Quayle Office Action dated May 11, 2022, from U.S. Appl. No. 29/652,529, filed Jul. 11, 2022, 7 pp.
Supplemental Notice of Allowance from U.S. Appl. No. 16/922,963 dated Jul. 7, 2022, 2 pp.
Ex Parte Quayle Office Action from U.S. Appl. No. 29/652,529, dated May 11, 2022, 8 pp.
Frnda, "Figure", Research Gate, Dec. 2015, Retrieved from the internet: URL: https://www.researchgate.net/figure/Network-topology-for-QoS-testing_fig1_287360264.
Juniper Networks, "Example: IDP Series HA Design with Juniper Networks ScreenOS Firewalls", Tech Library, Aug. 2, 2011, 6 pp., Retrieved from Internet on May 6, 2022, URL: https://www.juniper.net/documentation/en_US/dp5.1/topics/example/simple/intrusion-detection-prevention-third-party-high-availability-failover-screenos-implementing.html.
Notice of Allowance from U.S. Appl. No. 16/922,963, dated Apr. 6, 2022, 7 pp.
Supplemental Notice of Allowability from U.S. Appl. No. 16/922,963, dated Apr. 25, 2022, 2 pp.
Ahmed et al., "Implementing Data Center Overlay Protocols Sample Chapter", CCNP and CCIE Data Center Core DCCOR 350-601 Official Cert Guide, Pearson Education, Cisco Press, Hoboken NJ, Mar. 29, 2020, pp. 1-11.
Notice of Intent to Grant and Text Intended to Grant from counterpart European Application No. 19207335.1 dated Mar. 24, 2023, 82 pp.
Communication pursuant to Article 94(3) EPC from counterpart European Application No. 19207335.1 dated Oct. 10, 2022, 5 pp.
Notice of Allowance from U.S. Appl. No. 29/652,529 dated Nov. 9, 2022, 7 pp.
Response to Communication pursuant to Article 94(3) EPC dated Oct. 10, 2022, from counterpart European Application No. 19207335.1 filed Feb. 6, 2023, 15 pp.
Notice of Allowance from U.S. Appl. No. 16/922,915 dated Sep. 22, 2023, 15 pp.
"Network Topology Mapper" Apr. 27, 2020, posted at solarwinds.com, [site visited Oct. 20, 2023]. https://web.archive.org/web/20200427104513/https:1/www.solarwinds.com/network-topology-mapper (Year: 2020).
Extended Search Report from counterpart European Application No. 23194047.9 dated Dec. 1, 2023, 12 pp.
Notice of Allowance from U.S. Appl. No. 29/870,806 dated Nov. 1, 2023, 8 pp.
Supplemental Notice of Allowance from U.S. Appl. No. 29/870,806 dated Dec. 20, 2023, 3 pp.
U.S. Appl. No. 29/870,806, filed Feb. 6, 2023, naming inventors Naik et al.
Response to Extended Search Report dated Dec. 1, 2023, from counterpart European Application No. 23194047.9 filed Jul. 1, 2024, 20 pp.
First Office Action and Search Report from counterpart Chinese Application No. 201911076051.1 dated Aug. 14, 2024, 9 pp.
Hao et al., "Network Virtualization Based on OpenFlow", Translation provided for only the Abstract, Computer Applications, Dec. 15, 2016, 6 pp.
Shao, "Research on Optical Network Virtualization Technology Based on SDN", In the Chinese Language, Network security technology and application, Jun. 13, 2018, 2 pp.

\* cited by examiner

| | FLOW TYPE | TIME STAMP | NETWORK DEVICE | BYTES | SRC IP | DST IP | SRC PORT | DEST PORT | PROTO | SRC VN | DST VN |
|---|---|---|---|---|---|---|---|---|---|---|---|
| 1 | sFlow | 5 | a7 | 10 | 1.1.1.1 | 2.2.2.2 | 81 | 82 | TCP | | |
| 2 | overlay | 6 | | 20 | 1.1.1.1 | 2.2.2.2 | 81 | 82 | TCP | a | b |
| 3 | sFlow | 7 | a7 | 30 | 1.1.1.1 | 2.2.2.2 | 81 | 82 | TCP | | |
| 4 | overlay | 8 | | 40 | 1.1.1.1 | 2.2.2.2 | 81 | 83 | TCP | c | d |
| 5 | sFlow | 9 | a8 | 50 | 1.1.1.1 | 2.2.2.2 | 81 | 83 | TCP | | |
| 6 | overlay | 9 | | 60 | 1.1.1.1 | 2.2.2.2 | 81 | 82 | TCP | e | f |
| 7 | overlay | 10 | | 70 | 1.1.1.1 | 2.2.2.2 | 81 | 83 | TCP | g | h |

301

"SELECT networkDevice, bytes, srvVn WHERE timestamp in <7;9>" — 302

| | NETWORK DEVICE | BYTES | SRC VN |
|---|---|---|---|
| 1 | a7 | 30 | e |
| 2 | a8 | 50 | c |

UNDERLAY-OVERLAY CORRELATION

CROSS REFERENCE

This application is a continuation application of and claims priority to U.S. patent application Ser. No. 16/541,947 filed on Aug. 15, 2019, which is hereby incorporated by reference herein in its entirety.

TECHNICAL FIELD

This disclosure relates to analysis of computer networks, including analyzing paths taken by data through a network.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides. However, virtualization can cause some challenges when analyzing, evaluating, and/or troubleshooting the operation of the network.

SUMMARY

This disclosure describes techniques that include collecting information about physical network infrastructure (e.g., underlay flow data) and information about virtualization of the network (e.g., overlay flow data), and correlating the data to enable insights into network operation and performance. In some examples, samples of both underlay flow data and overlay flow data are collected and stored in a way that enables not only high availability and high-volume flow data collection, but also enables analysis of such data in response to analytical queries. Prior to or in response to such a query, underlay flow data may be enriched, augmented, and/or supplemented with overlay flow data to enable visibility into, identification of, and/or analysis of the underlay network infrastructure that may correspond to overlay data flows. Diagrams and other information illustrating which components of the underlay network infrastructure correspond to various overlay data flows may be presented in a user interface.

The techniques described herein may provide one or more technical advantages. For instance, by providing information about how the underlay network infrastructure relates to various overlay data flows, creation of useful tools for discovery and investigation is possible. In some examples, such tools may be used for efficient and streamlined troubleshooting and analysis of a virtualized network. As an example, the techniques described herein may allow for more efficient troubleshooting of connectivity, at least because the techniques enable identifying a substantially reduced number of underlay network devices likely pertinent to the connectivity issue.

In some examples, this disclosure describes operations performed by a network analysis system or other network system in accordance with one or more aspects of this disclosure. In one specific example, this disclosure describes a method comprising collecting, by a network analysis system on a network having a plurality of network devices, flow data including underlay flow data and overlay flow data; receiving, by the network analysis system, a request for information about a data flow, wherein the request for information specifies a source virtual address for the data flow and further specifies a destination virtual address for the data flow; identifying, by the network analysis system and based on the collected flow data, network devices that have processed at least one packet in the data flow; determining, by the network analysis system and based on the identified network devices, an underlay data path from a source virtual network associated with the source virtual address to a destination virtual network associated with the destination virtual address; and outputting, by the network analysis system, information about the underlay data path.

In another example, this disclosure describes a system including processing circuitry configured to perform operations described herein. In another example, this disclosure describes a non-transitory computer-readable storage medium comprises instructions that, when executed, configure processing circuitry of a computing system to perform operations described herein.

BRIEF DESCRIPTION OF THE DRAWINGS

FIG. 3 is a conceptual diagram illustrating an example query executing on stored underlay and overlay flow data, in accordance with one or more aspects of the present disclosure.

DETAILED DESCRIPTION

Data centers that use virtualized environments in which virtual hosts, such virtual machines or containers are deployed and executed on an underlying compute platform of physical computing devices provide efficiency, cost, and organizational advantages. Yet obtaining meaningful insights into application workloads is nevertheless essential in managing any data center fabric. Collecting traffic samples from networking devices may help provide such insights. In various examples described herein, traffic samples are collected and then processed by analytics algorithms, thereby making it possible to correlate information about overlay traffic with the underlay infrastructure. In some examples, a user interface may be generated to enable visualization of the data collected and how the underlay infrastructure correlates with various overlay networks. Presentation of such data in a user interface may provide insights into the network, and provide users, administrators, and/or other personnel with tools for network discovery, investigation, and troubleshooting.

Figure 1A:
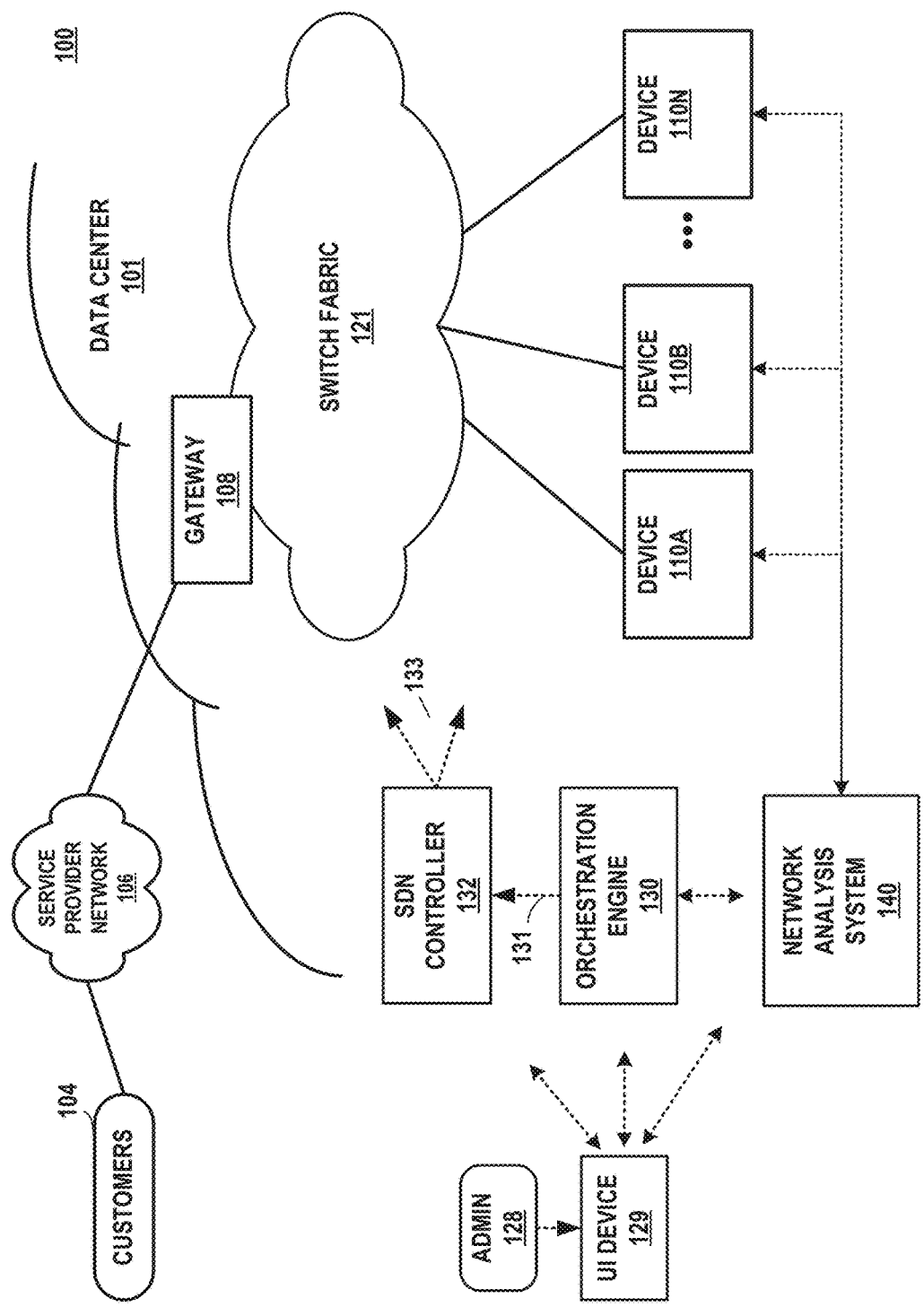
FIG. 1A is a conceptual diagram illustrating an example network that includes a system for analyzing traffic flows across a network and/or within data center, in accordance with one or more aspects of the present disclosure.

FIG. 1A is a conceptual diagram illustrating an example network that includes a system for analyzing traffic flows across a network and/or within data center, in accordance with one or more aspects of the present disclosure. FIG. 1A illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network system 100 and data center 101 may be appropriate in other instances. Such implementations may include a subset of the components included in the example of FIG. 1A and/or may include additional components not shown in FIG. 1A.

In the example of FIG. 1A, data center 101 provides an operating environment for applications and services for customers 104 coupled to data center 101 by service provider network 106. Although functions and operations described in connection with network system 100 of FIG. 1A may be illustrated as being distributed across multiple devices in FIG. 1A, in other examples, the features and techniques attributed to one or more devices in FIG. 1A may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1A or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1A, data center 101 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 101 is an individual network server, a network peer, or otherwise.

In the example of FIG. 1A, data center 101 includes a set of storage systems, application servers, compute nodes, or other devices, including network device 110A through network device 110N (collectively "network devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration. Network devices 110 may be any of a number of different types of network devices (core switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific virtual machines or other virtualized instances, such as containers. In such an example, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that may operate on a network and which may generate data (e.g. flow data or sFlow data) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestration engine 130 via northbound API 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 201. In such examples, user interface device 129 may communicate with controller 201 over a network or other means of communication. In other examples, user interface device 129 may be a local peripheral of controller 201, or may be integrated into controller 201.

In some examples, orchestration engine 130 manages functions of data center 101 such as compute, storage, networking, and application resources. For example, orchestration engine 130 may create a virtual network for a tenant within data center 101 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Network analysis system 140 interacts with one or more of devices 110 (and/or other devices) to collect flow data across data center 101 and/or network system 100. Such flow data may include underlay flow data and overlay flow data. In some examples, the underlay flow data may be collected through samples of flow data collected at Layer 2 of the OSI model. Overlay flow data may be data (e.g., samples of data) derived from overlay traffic across one or more virtual networks established within network system 100. Overlay flow data may, for example, include information identifying a source virtual network and a destination virtual network.

In accordance with one or more aspects of the present disclosure, network analysis system 140 of FIG. 1A may configure each of devices 110 to collect flow data. For instance, in an example that can be described with reference to FIG. 1A, network analysis system 140 outputs a signal to each of devices 110. Each of devices 110 receives a signal and interprets the signal as a command to collect flow data, including underlay flow data and/or overlay flow data. Thereafter, each of devices 110 communicates underlay flow data and/or overlay flow data to network analysis system 140 as data packets are processed by each of devices 110. Network analysis system 140 receives the flow data, prepares it for use in response to analytical queries, and stores the flow data. In the example of FIG. 1A, other network devices, including network devices within switch fabric 121 (and not specifically shown), may also be configured to collect underlay and/or overlay flow data.

Network analysis system 140 may process a query. For instance, in the example being described, user interface device 129 detects input and outputs information about the input to network analysis system 140. Network analysis system 140 determines that the information corresponds to a request for information about network system 100 from a user of user interface device 129. Network analysis system 140 processes the request by querying stored flow data. Network analysis system 140 generates a response to the query based on the stored flow data, and outputs information about the response to user interface device 129.

In some examples, the request received from user interface device 129 may include a source and/or destination virtual network. In such an example, the network analysis system 140 may, in response to such a request, identify one or more likely data paths over underlay network devices that packets traveling from the source virtual network to the destination virtual network may have taken. To identify the likely data paths, network analysis system 140 may correlate the collected overlay flow data with the collected underlay flow data so that the underlay network devices used by an overlay data flow can be identified.

Figure 1B:
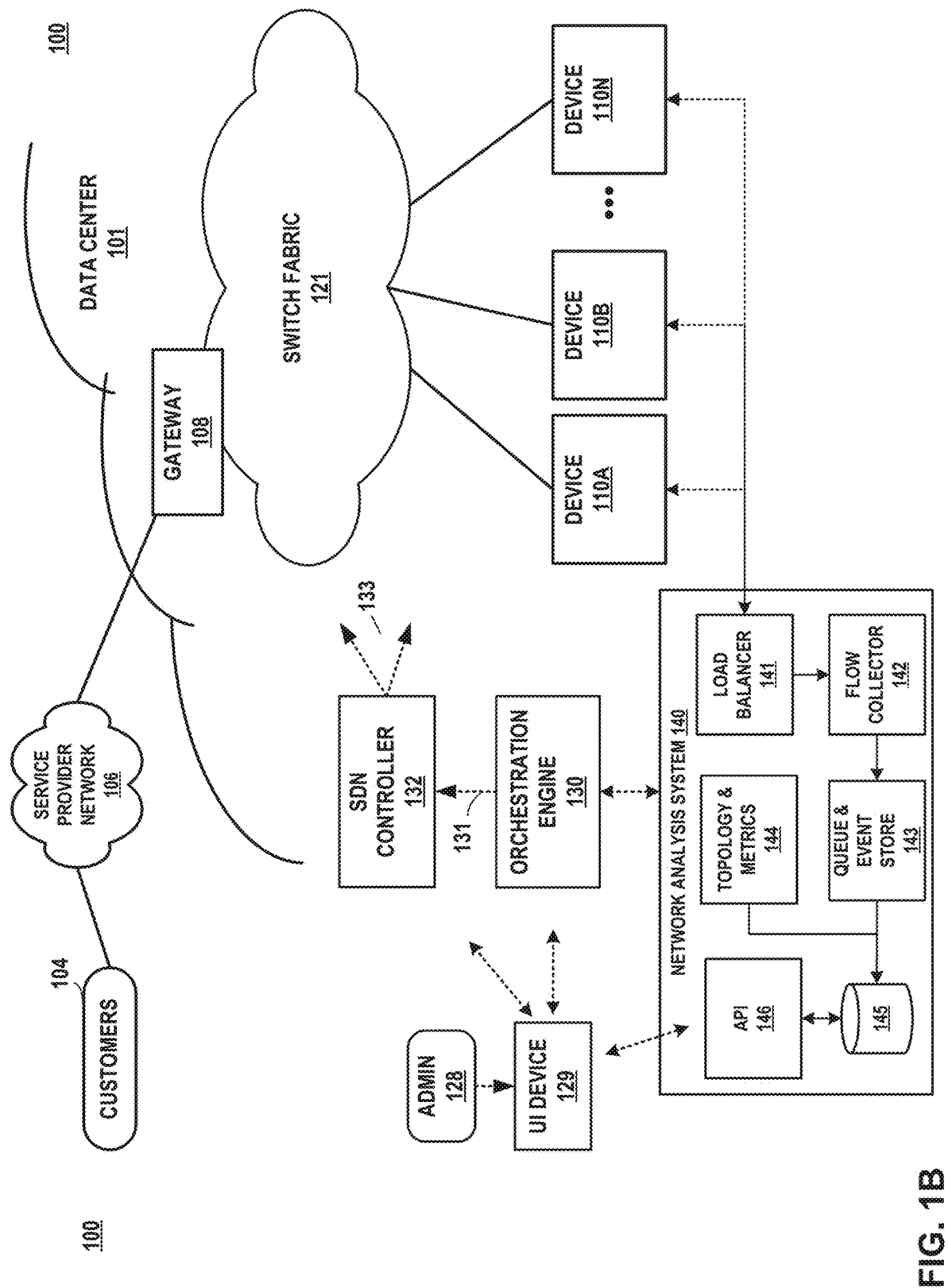
FIG. 1B a conceptual diagram illustrating example components of a system for analyzing traffic flows across a network and/or within data center, in accordance with one or more aspects of the present disclosure.

FIG. 1B a conceptual diagram illustrating example components of a system for analyzing traffic flows across a network and/or within data center, in accordance with one or more aspects of the present disclosure. FIG. 1B includes many of the same elements described in connection with FIG. 1A. Elements illustrated in FIG. 1B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A, although in some examples, such elements may involve alternative implementation with more, fewer, and/or different capabilities and attributes.

Unlike FIG. 1A, however, FIG. 1B illustrates components of network analysis system 140. Network analysis system 140 is shown as including load balancer 141, flow collector 142, queue & event store 143, topology & metrics source 144, data store 145 and flow API 146. In general, network analysis system 140 and components of network analysis system 140 are designed and/or configured to ensure high availability and an ability to process a high volume of flow data. In some examples, multiple instances of components of network analysis system 140 may be orchestrated (e.g., by orchestration engine 130) to execute on different physical servers to ensure that there is no single point of failure for any component of network analysis system 140. In some examples, network analysis system 140 or components thereof may be scaled independently and horizontally to enable efficient and/or effective processing of a desired volume of traffic (e.g., flow data).

Network analysis system 140 of FIG. 1B may, as in FIG. 1A, configure each of devices 110 to collect flow data. For instance, network analysis system 140 may output a signal to each of devices 110 to configure each of devices 110 to collect flow data, including underlay flow data and overlay flow data. One or more of devices 110 may thereafter collect underlay flow data and overlay flow data and report such flow data to network analysis system 140.

In FIG. 1B, receiving the flow data from each of devices 110 is performed by load balancer 141 of network analysis system 140. For instance, in FIG. 1B, load balancer 141 may receive the flow data from each of devices 110. Load balancer 141 may distribute the traffic across multiple flow collectors to ensure an active/active failover strategy for the flow collectors. In some examples, multiple load balancers 141 may be required to ensure high availability and scalability.

Flow collector 142 collects data from load balancer 141. For example, flow collector 142 of network analysis system 140 receives and processes flow packets from each of devices 110 (after processing by load balancer 141). Flow collector 142 sends the flow packets upstream to queue & event store 143. In some examples, flow collector 142 may address, process, and/or accommodate unified data from sFlows, NetFlow v9, IPFIX, jFlow, Contrail Flow, and other formats. Flow collector 142 may be capable of parsing the inner header from sFlow packets and other data flow packets. Flow collector 142 may be able to handle message overflows, enriched flow records with topology information (e.g., AppFormix topology information) and. Flow collector 142 may also be able to covert data to binary format before writing or sending data to queue & event store 143. Underlay flow data of the "sFlow" type, which refers to a "sampled flow," is a standard for packet export at Layer 2 of the OSI model. It provides a means for exporting truncated packets, together with interface counters for the purpose of network monitoring.

Queue & event store 143 processes the collected data. For example, queue & event store 143 may receive data from one or more flow collectors 142, store the data, and make the data available for ingestion in data store 145. In some examples, this enables separation of the task of receiving and storing large volumes of data from the task of indexing the data and preparing it for analytical queries. In some examples, queue & event store 143 may also enable independent users to directly consume the stream of flow records. In some examples, queue & event store 143 may be used to discover anomalies and produce alerts in real time. In some examples, flow data may be parsed by reading encapsulated packets, including VXLAN, MPLS over UDP, and MPLS over GRE. From the inner (underlay) packet, queue & event store 143 parses the source IP, destination IP, source port, destination port, and protocol. Some types of flow data (including sFlow data) include only a fragment of sampled network traffic (e.g., the first 128 bytes), so in some cases, the flow data might not include all of the inner fields. In such an example, such data may be marked as missing.

Topology & metrics source 144 may enrich or augment the data with topology information and/or metrics information. For example, topology & metrics source 144 may provide network topology metadata, which may include identified nodes or network devices, configuration information, configuration, established links, and other information about such nodes and/or network devices. In some examples, topology & metrics source 144 may use AppFormix topology data or may be an executing AppFormix module. The information received from topology & metrics source 144 may be used to enrich flow data collected by flow collector 142 and support flow API 146 in processing queries of data store 145.

Data store 145 may be configured to store data received from queue & event store 143 and topology & metrics source 144 in an indexed format, enabling fast aggregation queries and fast random-access data retrieval. In some examples, data store 145 may achieve fault tolerance and high availability by sharding and replicating the data.

Flow API 146 may process query requests sent by one or more user interface devices 129. For instance, in some examples, flow API 146 may receive a query request from user interface device 129 through an HTTP POST request. In such an example, flow API 146 converts information included within the request to a query for data store 145. To create the query, flow API 146 may use topology information from topology & metrics source 144. Flow API 146 may use one or more of such queries to perform analytics on behalf of user interface device 129. Such analytics may include traffic deduplication, overlay-underlay correlation, traffic path identification, and/or heatmap traffic calculation. In particular, such analytics may involve correlating the underlay flow data with the overlay flow data, thereby enabling identification of which underlay network devices are relevant to traffic flowing over a virtual network and/or between two virtual machines.

Through techniques in accordance with one or more aspects of the present disclosure, such as by correlating underlay flow data with overlay flow data, network analysis system 140 may be able to determine, for a given data flow, which tenant the data flow belongs to in a multitenant data center. Further, network analysis system 140 may also be able to determine which virtual computing instances (e.g., virtual machines or containers) are source and/or destination virtual computing instances for such a flow. Still further, correlating underlay flow data with overlay flow data, such as by enriching the underlay flow data with overlay flow data, may facilitate troubleshooting of performance or other issues that may arise in network system 100.

For instance, in some cases, a connectivity problem may arise during a particular timeframe where limited information is available, but where information about the source and destination virtual networks is known. Troubleshooting such a problem can be challenging, since it may be difficult to pinpoint what physical path the data flow took through the network, given the source and destination virtual networks. Since the actual physical path through the underlay infrastructure might not otherwise be readily known, there could be many network devices or physical links that are a potential cause of the connectivity problem. However, by collecting underlay and overlay flow data, and enriching the underlay flow data with the overlay flow data collected during the same time period, it may be possible to identify which underlay network devices processed the data flow and the physical links traversed by the data flow, thereby enabling a determination of the data path—or the most likely or a set of likely data paths—the data flow took through the network, or at least a determination of a relatively small number of likely data paths for a data flow. Accordingly, troubleshooting such a connectivity issue may significantly more efficient, at least because the number of underlay network devices pertinent to the connectivity problem can be substantially reduced.

Figure 2:
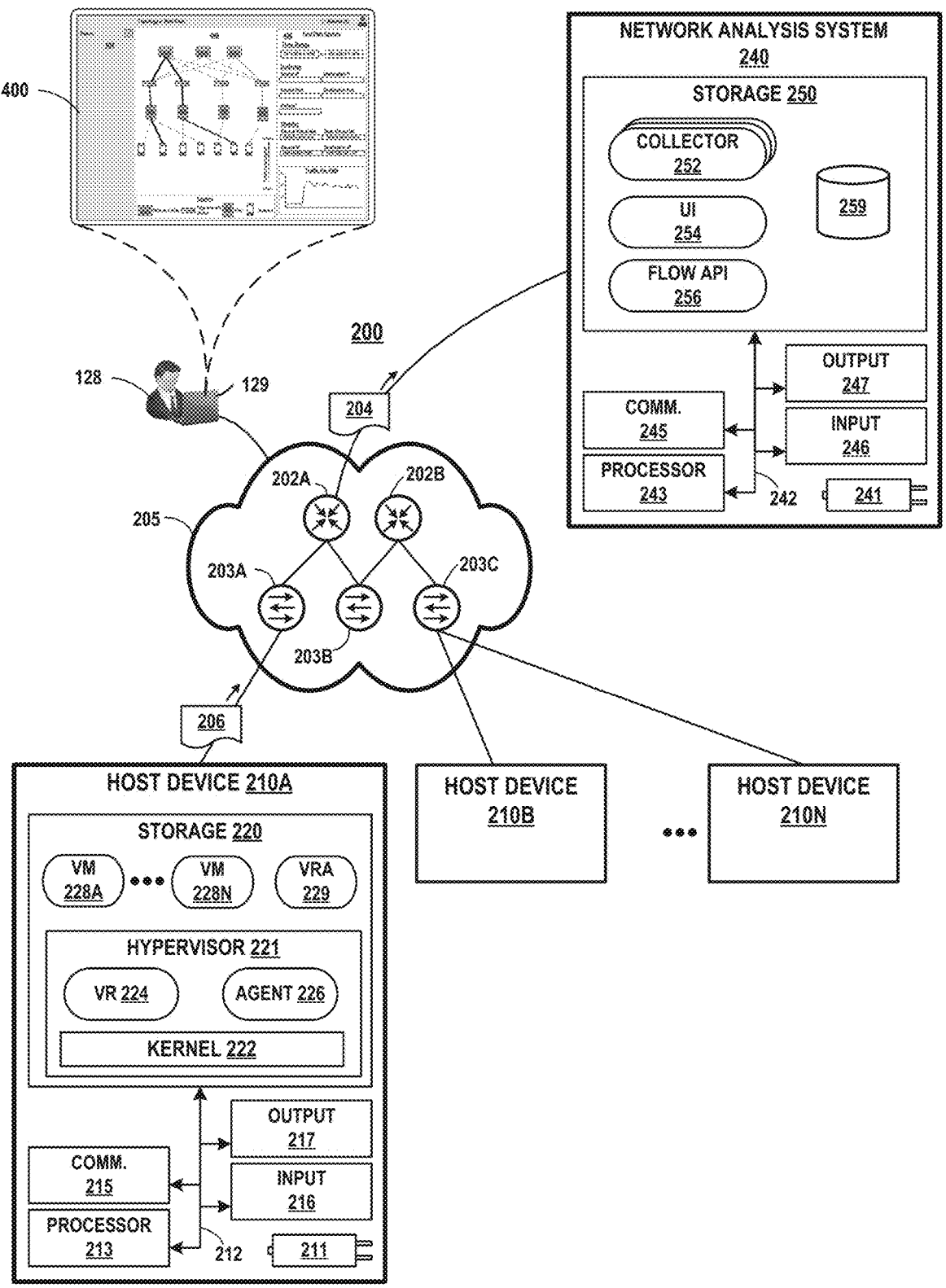
FIG. 2 is a block diagram illustrating an example network for analyzing traffic flows across a network and/or within data center, in accordance with one or more aspects of the present disclosure.

FIG. 2 is a block diagram illustrating an example network for analyzing traffic flows across a network and/or within data center, in accordance with one or more aspects of the present disclosure. Network system 200 of FIG. 2 may be described as an example or alternative implementation of network system 100 of FIG. 1A or FIG. 1B. One or more aspects of FIG. 2 may be described herein within the context of FIG. 1.

Although a data center, such as that illustrated in FIG. 1A, FIG. 1B, and FIG. 2 may be operated by any entity, some data centers are operated by a service provider, where the business model of such a service provider is to provide computing capacity to its clients. For this reason, data centers usually contain a huge number of compute nodes, or host devices. In order to operate efficiently, those hosts have to be connected to each other and to the external world, and that ability is provided through physical network devices, which may be interconnected in a leaf-spine topology. The collection of these physical devices, such as network devices and hosts, form the underlay network.

Each host device in such a data center usually has several virtual machines running on it, which are called workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience connectivity issues between two applications that are running on different workloads. Troubleshooting such issues tends to be complicated by the deployment of the workloads in a large multi-tenant data center.

In the example of FIG. 2, network 205 connects network analysis system 240, host device 210A, host device 210B, and host device 210N. Network analysis system 240 may correspond to an example or alternative implementation of network analysis system 140 illustrated in FIG. 1A and FIG. 1B. Host devices 210A, 210B, through 210N may be collectively referenced as "host devices 210," representing any number of host devices 210.

Each of host devices 210 may be an example of devices 110 of FIG. 1A and FIG. 1B, but in the example of FIG. 2, each of host devices 210 is implemented as a server or host device that operates as a compute node of a virtualized data center, as opposed to a network device. Thus, in the example of FIG. 2, each of host devices 210 executes multiple virtual computing instances, such as virtual machines 228.

Also connected to network 205 is user interface device 129, which may be operated by administrator 128, as in FIG. 1A and FIG. 1B. In some examples, user interface device 129 may present, at a display device associated with user interface device 129, one or more user interfaces, some of which may have a form similar to user interface 400.

FIG. 2 also illustrates underlay flow data 204 and overlay flow data 206 flowing within network system 200. In particular, underlay flow data 204 is shown leaving spine device 202A and flowing to network analysis system 240. Similarly, overlay flow data 206 is shown leaving host device 210A and flowing across 205. In some examples, overlay flow data 206 is communicated through network 205 and to network analysis system 240 as described herein. For simplicity, FIG. 2 illustrates a single instance of underlay flow data 204 and a single instance of overlay flow data 206. However, it should be understood that each of spine devices 202 and leaf devices 203 may generate and communicate underlay flow data 204 to network analysis system 240, and in some examples, each of host devices 210 (and/or other devices) may generate underlay flow data 204 and communicate such data across network 205 to network analysis system 240. Further, it should be understood that each of host devices 210 (and/or other devices) may generate overlay flow data 206 and communicate such data over network 205 to network analysis system 240.

Network 205 may correspond to any of switch fabric 121 and/or service provider network 106 of FIG. 1A and FIG. 1B, or alternatively, may correspond to a combination of switch fabric 121, service provider network 106, and/or another network. Network 205 may also include some of the components of FIG. 1A and FIG. 1B, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of network devices may be included in network 205, including core switches, edge network devices, top-of-rack devices, and other network devices.

In general, network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Network analysis system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, network analysis system 240 represents a cloud computing system, server farm, and/or server cluster (or portion thereof) that provides services to client devices and other devices or systems. In other examples, network analysis system 240 may represent or be implemented through one or more virtualized compute instances (e.g., virtual machines, containers) of a data center, cloud computing system, server farm, and/or server cluster.

In the example of FIG. 2, network analysis system 240 may include power source 241, one or more processors 243, one or more communication units 245, one or more input devices 246, and one or more output devices 247. Storage devices 250 may include one or more collector modules 252, user interface module 254, flow API 256, and data store 259.

One or more of the devices, modules, storage areas, or other components of network analysis system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of network analysis system 240. Power source 241 may receive power from the primary alternating current (AC) power supply in a data center, building, home, or other location. In other examples, power source 241 may be a battery or a device that supplies direct current (DC). In still further examples, network analysis system 240 and/or power source 241 may receive power from another source. One or more of the devices or components illustrated within network analysis system 240 may be connected to power source 241, and/or may receive power from power source 241. Power source 241 may have intelligent power management or consumption capabilities, and such features may be controlled, accessed, or adjusted by one or more modules of network analysis system 240 and/or by one or more processors 243 to intelligently consume, allocate, supply, or otherwise manage power.

One or more processors 243 of network analysis system 240 may implement functionality and/or execute instructions associated with network analysis system 240 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Central monitoring system 210 may use one or more processors 243 to perform operations in accordance with one or more aspects of the present disclosure using software, hardware, firmware, or a mixture of hardware, software, and firmware residing in and/or executing at network analysis system 240.

One or more communication units 245 of network analysis system 240 may communicate with devices external to network analysis system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of network analysis system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of network analysis system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within network analysis system 240 may store information for processing during operation of network analysis system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of network analysis system 240 and/or one or more devices or systems illustrated as being connected to network analysis system 240.

In some examples, one or more storage devices 250 are implemented through temporary memory, which may mean that a primary purpose of the one or more storage devices is not long-term storage. Storage devices 250 of network analysis system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Collector module 252 may perform functions relating to receiving both underlay flow data 204 and overlay flow data 206, and performing load balancing as necessary to ensure high availability, throughput, and scalability for collecting such flow data. Collector module 252 may process the data prepare the data for storage within data store 259. In some examples, collector module 252 may store the data within data store 259.

User interface module 254 may perform functions relating to generating user interfaces for presenting the results of analytical queries performed by flow API 256. In some examples, user interface module 254 may generate information sufficient to generate a set of user interfaces, and cause communication unit 215 to output such information over network 205 for use by user interface device 129 to present one or more user interfaces at a display device associated with user interface device 129.

Flow API 256 may perform analytical queries involving data stored in data store 259 that is derived from collection of underlay flow data 204 and overlay flow data 206. In some examples, flow API 256 may receive a request in the form of information derived from an HTTP POST request, and in response, may convert the request into a query to be executed on data store 259. Further, in some examples, flow API 256 may fetch topology information pertaining to the device 110, and perform analytics that include data deduplication, overlay-underlay correlation, traffic path identification, and heatmap traffic calculation.

Data store 259 may represent any suitable data structure or storage medium for storing information related to data flow information, including storage of data derived from underlay flow data 204 and overlay flow data 206. Data store 259 may be responsible for storing data in an indexed format, enabling fast data retrieval and execution of queries. The information stored in data store 259 may be searchable and/or categorized such that one or more modules within network analysis system 240 may provide an input requesting information from data store 259, and in response to the input, receive information stored within data store 259. Data store 259 may be primarily maintained by collector module 252. Data store 259 may be implemented through multiple hardware devices, and may achieve fault tolerance and high availability by sharding and replicating data. In some examples, data store 259 may be implemented using the open source ClickHouse column-oriented database management system.

Each of host devices 210 represents a physical computing device or compute node that provides an execution environment for virtual hosts, virtual machines, containers, and/or other virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes power source 211, one or more processors 213, one or more communication units 215, one or more input devices 216, one or more output devices 217, and one or more storage devices 220. Storage devices 220 may include hypervisor 221, including kernel module 222, virtual router module 224, and agent module 226. Virtual machines 228A through 228N (collectively "virtual machines 228" and representing any number of virtual machines 228) execute on top of hypervisor 221 or are controlled by hypervisor 221. Similarly, virtual router agent 229 may execute on, or under the control of, hypervisor 221. One or more of the devices, modules, storage areas, or other components of host device 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of host device 210. Processor 213 may implement functionality and/or execute instructions associated with host device 210. Communication unit 215 may communicate with other devices or systems on behalf of host device 210. One or more input devices 216 and output devices 217 may represent any other input and/or output devices associated with host device 210. Storage devices 220 may store information for processing during operation of host device 210A. Each of such components may be implemented in a manner similar to those described herein in connection with network analysis system 240 or otherwise.

Hypervisor 221 may serve as a module or system that instantiates, creates, and/or executes one or more virtual machines 228 on an underlying host hardware device. In some contexts, hypervisor 221 may be referred to as a virtual machine manager (VMM). Hypervisor 221 may execute within the execution environment provided by storage devices 220 and processors 213 or on top of an operating system kernel (e.g., kernel module 222). In some examples, hypervisor 221 is an operating system-level component that executes on a hardware platform (e.g., host 210) to provide a virtualized operating environment and orchestration controller for virtual machines 228, and/or other types of virtual computing instances. In other examples, hypervisor 221 may be a software and/or firmware layer that provides a lightweight kernel and operates to provide a virtualized operating environment and orchestration controller for virtual machines 228, and/or other types of virtual computing instances. Hypervisor 221 may incorporate the functionality of kernel module 222 (e.g., as a "type 1 hypervisor"), as shown in FIG. 2. In other examples, hypervisor 221 may execute on a kernel (e.g., as a "type 2 hypervisor").

Virtual router module 224 may execute multiple routing instances for corresponding virtual networks within data center 101 and may route packets to appropriate virtual machines executing within the operating environment provided by devices 110. Virtual router module 224 may also be responsible for collecting overlay flow data, such as Contrail Flow data when used in an infrastructure in which the Contrail SDN is employed. Accordingly, each of host devices 210 may include a virtual router. Packets received by virtual router module 224 of host device 210A, for instance, from the underlying physical network fabric may include an outer header to allow the physical network fabric to tunnel the payload or "inner packet" to a physical network address for a network interface of host device 210A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Agent module 226 may execute as part of hypervisor 221, or may execute within kernel space or as part of kernel module 222. Agent module 226 may monitor some or all of the performance metrics associated with host device 210A, and may implement and/or enforcing policies, which may be received from a policy controller (not shown in FIG. 2).

Agent module 226 may configure virtual router module 224 to communicate overlay flow data to network analysis system 240.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition virtual and/or physical address space provided by storage device 220 into kernel space, which is protected and may be inaccessible by user processes.

In general, each of virtual machines 228 may be any type of software application and each may be assigned a virtual address for use within a corresponding virtual network, where each of the virtual networks may be a different virtual subnet provided by virtual router module 224. Each of virtual machines 228 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., host device 210A in the example of FIG. 2.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines. Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

Virtual router agent 229 is included within host device 210A in the example of FIG. 2 and may communicate with SDN controller 132 and virtual router module 224 so as to control the overlay of virtual networks and coordinate the routing of data packets within host device 210A. In general, virtual router agent 229 communicates with SDN controller 132, which generates commands to control routing of packets through data center 101. Virtual router agent 229 may execute in user space and operate as a proxy for control plane messages between virtual machines 228 and SDN controller 132. For example, virtual machine 228A may request to send a message using its virtual address via virtual router agent 229, and virtual router agent 229 may in turn send the message and request that a response to the message be received for the virtual address of virtual machine 228A, which originated the first message. In some cases, virtual machine 228A may invoke a procedure or function call presented by an application programming interface of virtual router agent 229, and in such an example, virtual router agent 229 handles encapsulation of the message as well, including addressing.

Network analysis system 240 may configure each of spine devices 202 and leaf devices 203 to collect underlay flow data 204. For instance, in an example that can be described with reference to FIG. 2, collector module 252 of network analysis system 240 causes communication unit 215 to output one or more signals over network 205. Each of spine devices 202 and leaf devices 203 detect a signal and interpret the signal as a command to enable collection of underlay flow data 204. For example, upon detecting a signal from network analysis system 240, spine device 202A configures itself to collect sFlow data and communicate the sFlow data (as underlay flow data 204) over network 205 to network analysis system 240. As another example, upon detecting a signal from network analysis system 240, leaf device 203A detects a signal and configures itself to collect sFlow data and communicate the sFlow data over network 205 to network analysis system 240. Further, in some examples, each of host devices 210 may detect a signal from network analysis system 240, and interpret the signal as a command to enable collection of sFlow data. Accordingly, in some examples, sFlow data may be collected by collector modules executing on host devices 210.

Accordingly, in the example being described, spine devices 202, leaf devices 203 (and possibly one or more of host devices 210) collect sFlow data. In other examples, however, one or more of such devices may collect other types of underlay flow data 204, such as IPFIX and/or NetFlow data. Collecting any such underlay flow data may involve collection of a five-tuple of data that includes the source and destination IP address, the source and destination port number, and the network protocol being used.

Network analysis system 240 may configure each of host devices 210 to collect overlay flow data 206. For instance, continuing with the example being described with reference to FIG. 2, collector module 252 causes communication unit 215 to output one or more signals over network 205. Each of host devices 210 detect a signal that is interpreted as a command to collect overlay flow data 206 and communicate overlay flow data 206 to network analysis system 240. For example, with reference to host device 210A, communication unit 215 of host device 210A detects a signal over network 205 and outputs information about the signal to hypervisor 221. Hypervisor 221 outputs information to agent module 226. Agent module 226 interprets the information from hypervisor 221 as a command to collect overlay flow data 206. Agent module 226 configures virtual router module 224 to collect overlay flow data 206 and communicate overlay flow data 206 to network analysis system 240.

Overlay flow data 206 includes, in at least some examples, the five-tuple of information about the source and destination addresses, ports, and protocol. In addition, overlay flow data 206 may include information about the virtual networks associated with the flow, including the source virtual network and the destination virtual network. In some examples, particularly for a network configured using the Contrail SDN available from Juniper Networks of Sunnyvale, California, overlay flow data 206 may correspond to Contrail Flow data.

In the example being described, agent module 226 configures virtual router module 224 to collect overlay flow data 206. In other examples, however, hypervisor 221 may configure virtual router module 224 to collect overlay flow data 206. Further, in other examples, overlay flow data 206 data may be collected by another module (alternatively or in addition), such as agent module 226 or even by hypervisor 221 or kernel module 222. Accordingly, in some examples, host devices 210 may collect both underlay flow data (sFlow data) and overlay flow data (e.g., Contrail Flow data).

Network analysis system 240 may receive both underlay flow data 204 and overlay flow data 206. For instance, continuing with the example and with reference to FIG. 2, spine device 202A samples, detects, senses, and/or collects underlay flow data 204. Spine device 202A outputs a signal over network 205. Communication unit 215 of network analysis system 240 detects a signal from spine device 202A and outputs information about the signal to collector module 252. Collector module 252 determines that the signal includes information about underlay flow data 204.

Similarly, virtual router module 224 of host device 210A samples, detects, senses, and/or collects overlay flow data 206 at host device 210A. Virtual router module 224 causes communication unit 215 of host device 210A to output a signal over network 205. Communication unit 215 of network analysis system 240 detects a signal from host device 210A and outputs information about the signal to collector module 252. Collector module 252 determines that the signal includes information about overlay flow data 206.

Network analysis system 240 may process both underlay flow data 204 and overlay flow data 206 received from various devices within network system 100. For instance, still continuing with the same example, collector module 252 processes the signals received from spine device 202A, host device 210A, and other devices by distributing the signals across multiple collector modules 252. In some examples, each of collector modules 252 may execute on a different physical server, and may be scaled independently and horizontally to handle the desired volume or peak capacity of flow traffic from spine devices 202, leaf devices 203, and host devices 210. Each of collector modules 252 stores each instance of underlay flow data 204 and overlay flow data 206 and makes the stored data available for ingestion in data store 259. Collector module 252 indexes the data and prepare the data for use with analytical queries.

Network analysis system 240 may store underlay flow data 204 and overlay flow data 206 in data store 259. For instance, in FIG. 2, collector module 252 outputs information to data store 259. Data store 259 determines that the information corresponds to underlay flow data 204 and overlay flow data 206. Data store 259 stores the data in indexed format, enabling fast aggregation queries and fast random-access data retrieval. In some examples, data store 259 may achieve fault tolerance and high availability by sharding and replicating the data across multiple storage devices, which may be located across multiple physical hosts.

Network analysis system 240 may receive a query. For instance, still continuing with the same example and with reference to FIG. 2, user interface device 129 detects input and outputs, over network 205, a signal derived from the input. Communication unit 215 of network analysis system 240 detects a signal and outputs information about the signal to flow API 256. Flow API 256 determines that the signal corresponds to a query from a user of user interface device 129 for information about network system 200 for a given time window. For example, a user of user interface device 129 (e.g., administrator 128) may have noticed that a particular virtual machine within a particular virtual network seems to be dropping packets at an unusual rate, and may seek to troubleshoot the problem. One way to troubleshoot the problem is to identify which network devices (e.g., which underlay router) are on the data path that seems to be dropping packets. Accordingly, administrator 128 may seek to identify a likely path taken between a source and destination virtual machine by querying network analysis system 240.

Network analysis system 240 may process the query. For instance, again continuing with the example being described in the context of FIG. 2, flow API 256 determines that the signal received from user interface device 129 includes information about a source and/or destination virtual network. Flow API 256 queries data store 259 by enriching the underlay flow data stored within data store 259 to include the virtual network data from the overlay flow data from the time window identified in the query. To perform the query, flow API 256 narrows the data down to the specified time window and for each relevant underlay flow data 204 record, flow API 256 adds any source and/or destination virtual network information from overlay flow data 206 records that have values matching those of a corresponding underlay flow data 204 record. Flow API 256 identifies one or more network devices identified by the enriched underlay flow data. Flow API 256 determines, based on the identified network devices, one or more likely paths taken between the specified source and destination virtual networks. In some examples, a global join technique (e.g., available in Click-House database management systems) can be used for enrichment. In such an example, flow API 256 gathers overlay flow data and broadcast such data to all of the nodes. The data is then used as a lookup table, independently for each node. In order to minimize the size of the table, flow API 256 may perform predicate pushdown of the filtering criteria to the subqueries.

Network analysis system 240 may cause a user interface illustrating a likely path between the source and destination virtual network to be presented at user interface device 129. Flow API 256 outputs information about the determined likely paths to user interface module 254. User interface module 254 uses the information from flow API 256 to generate data sufficient to create a user interface presenting information about likely paths between the source and destination virtual networks. User interface module 254 causes communication unit 215 to output a signal over network 205. User interface device 129 detects a signal over network 205 and determines that the signal includes information sufficient to generate a user interface. User interface device 129 generates a user interface (e.g., user interface 400) and presents it at a display associated with user interface device 129. In some examples, user interface 400 (also illustrated in FIG. 4) present information illustrating one or more possible paths between virtual machines, and may include information about how much data is or has been communicated between those virtual machines.

Modules illustrated in FIG. 2 (e.g., virtual router module 224, agent module 226, collector module 252, user interface module 254, flow API 256) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 3 is a conceptual diagram illustrating an example query executing on stored underlay and overlay flow data, in accordance with one or more aspects of the present disclosure. FIG. 3 illustrates data table 301, query 302, and output table 303. Data table 301 illustrates records of both underlay and overlay flow data that might be stored within data store 259 of FIG. 2. Query 302 represents a query that may be generated by flow API 256 in response to a request received by network analysis system 240 from user interface device 129. Output table 303 represents data generated from data table 301 in response to executing query 302.

In the example of FIG. 3, and in accordance with one or more aspects of the present disclosure, network analysis system 240 of FIG. 2 may populate data table 301. For instance, with reference to both FIG. 2 and FIG. 3, network analysis system 240 collects both underlay flow data 204 and overlay flow data 206 from various devices within network system 200. Collector module 252 of network analysis system 240 stores the collected data within data store 259. In the example of FIG. 3, the data stored within data store 259 corresponds to data table 301.

Network analysis system 240 may execute a query after data corresponding to data table 301 is stored within data store 259. For instance, still referring to FIG. 2 and the example of FIG. 3, communication unit 215 of network analysis system 240 detects a signal that flow API 256 determines corresponds to query 302. In the example of FIG. 3, query 302 is the following SQL-like query:

SELECT networkDevice, bytes, srcVn WHERE timestamp in <7;9>

Flow API 256 applies query 302 to data table 301, thereby selecting rows from data table 301 that identify a network device, and that have a timestamp greater than or equal to 7 and less than or equal to 9. Flow API 256 identifies only two network devices satisfying this criteria: network device "a7" (from row 3 of data table 301) and network device "a8" (row 5 of data table 301).

Network analysis system 240 may correlate the overlay data with the underlay data to identify which source virtual networks have used the identified network devices during the relevant time frame. For instance, in the example of FIG. 3, flow API 256 of network analysis system 240 determines whether any of the overlay flow data rows in that same time frame (timestamps 7-9) have the same five-tuple data (i.e., source and destination address and port number, and protocol) as rows 3 and 5. Flow API 256 determines that the overlay data from row 6 is within the specified timeframe and also has five-tuple data matching that of row 3. Accordingly, flow API 256 determines that the source virtual network for device "a7" is source virtual network "e" (see "src vn" column of row 1 of output table 303). Similarly, flow API 256 determines that the overlay data from row 4 of data table 301 is within the specified timeframe and also has five-tuple data matching that of row 5 of data table 301. Accordingly, flow API 256 determines that the source virtual network for device "a8" is source virtual network "c" (see row 2 of output table 303).

Where more than one instance (row) of overlay flow data is available, any or all of such data can be used to identify a source virtual network. This is based on the assumption that the virtual network configuration changes infrequently. The enrichment process described herein may be used for queries requesting the "top N" network attributes. The enrichment process may also be used to identify paths, as illustrated in FIG. 4.

Figure 4:
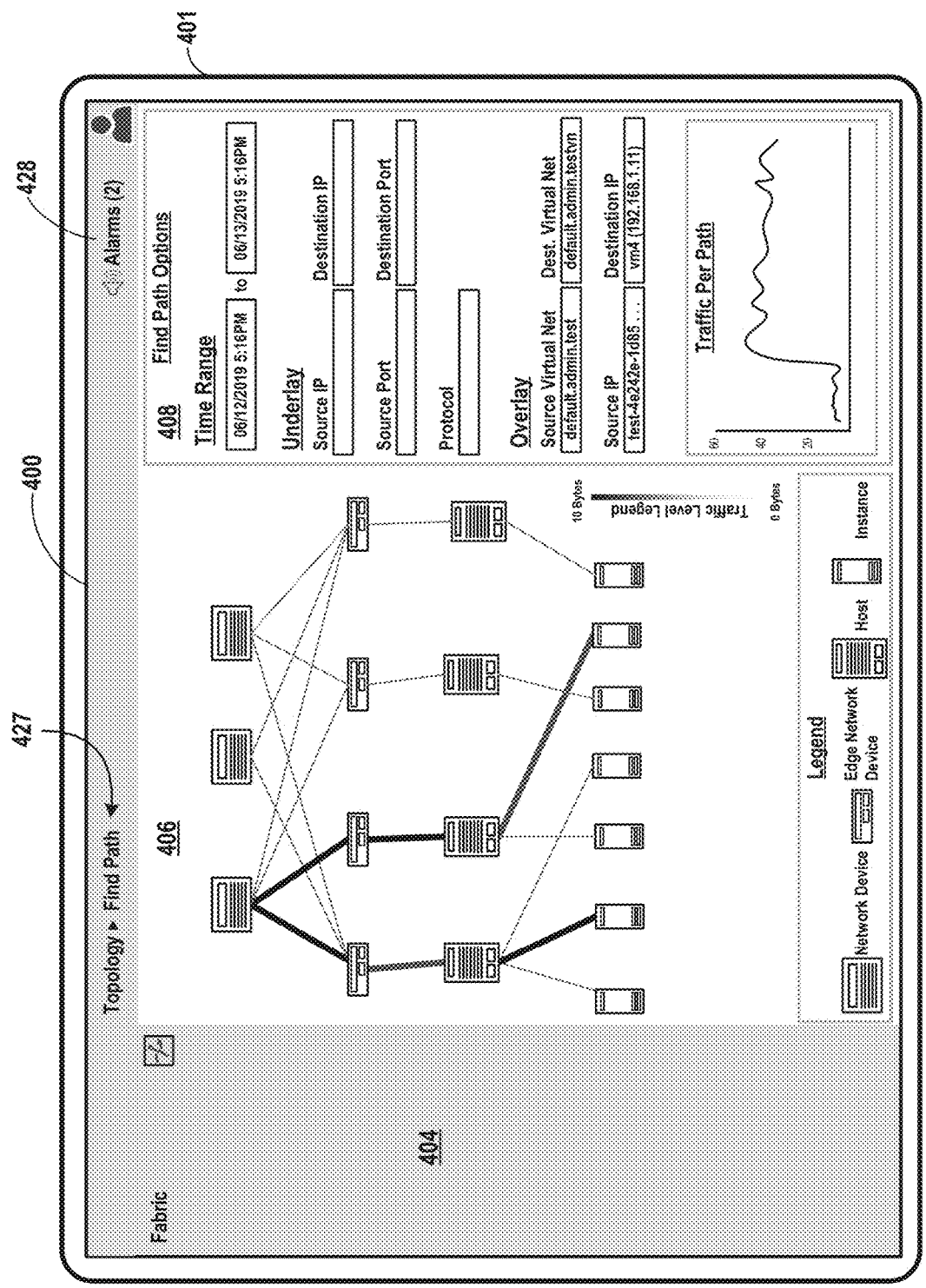
FIG. 4 is a conceptual diagram illustrating an example user interface presented by a user interface device in accordance with one or more aspects of the present disclosure.

FIG. 4 is a conceptual diagram illustrating an example user interface presented by a user interface device in accordance with one or more aspects of the present disclosure. FIG. 4 illustrates user interface 400. Although user interface 400 is shown as graphical user interface, other types of interfaces may be presented in other examples, including a text-based user interface, a console or command-based user interface, a voice prompt user interface, or any other appropriate user interface. User interface 400 as illustrated in FIG. 4 may correspond to a user interface generated by user interface module 254 of network analysis system 240 and presented at user interface device 129 of FIG. 2. One or more aspects relating to the generation and/or presentation of user interface 400 may be described herein within the context of FIG. 2.

In accordance with one or more aspects of the present disclosure, network analysis system 240 may perform a query to identify a path. For instance, in an example that can be described with reference to FIG. 2, user interface device 129 detects input and outputs a signal over network 205. Communication unit 215 of network analysis system 240 detects a signal that flow API 256 determines corresponds to a query for network information. Flow API 256 performs the query (e.g., in the manner described in connection with FIG. 3) and outputs information about the results to user interface module 254. To find the path between two virtual machines, flow API 256 may determine the most likely path (and the traffic that traveled over the determined path). In addition, flow API 256 may perform an additional query to evaluate overlay data flows exclusively, to identify the traffic registered on virtual router modules 224, thereby enabling the identification and display of traffic between the relevant virtual machines and host device. Flow API 256 may identify the host-virtual machine and virtual machine-host paths in a similar manner.

Network analysis system 240 may generate a user interface, such as user interface 400, for presentation at a display device. For instance, still referring to FIG. 2 and FIG. 4, user interface module 254 generates information underlying user interface 400 and causes communication unit 215 to output a signal over network 205. User interface device 129 detects a signal and determines that the signal includes information sufficient to present a user interface. User interface device 129 presents user interface 400 at a display device associated with user interface device 129 in the manner illustrated in FIG. 4.

In FIG. 4, user interface 400 is presented within display window 401. User interface 400 includes sidebar region 404, main display region 406, and options region 408. Sidebar region 404 provides an indication of which user interface mode is being presented within user interface 400, which in the example of FIG. 4, corresponds to a "Fabric" mode. Other modes may be available as appropriate for other network analysis scenarios. Along the top of main display region 406 is navigation interface component 427, which may also be used to select a type or mode of network analysis to be performed. Status notification display element 428 may provide information about alarms or other status information relating to one or more networks, users, elements, or resources.

Main display region 406 presents a network diagram, and may provide a topology of various network devices included within the network being analyzed. In the example shown in FIG. 4, the network is illustrated with network devices, edge network devices, hosts, and instances, as indicated in the "Legend" shown along the bottom of main display region 406. Actual or potential data paths between the network devices and other components are illustrated within main display region 406. Although a limited number of different types of network devices and components are shown in FIG. 4, in other examples, other types of devices or components or elements could be presented and/or specifically illustrated, including core switch devices, spine devices, leaf devices, physical or virtual routers, virtual machines, containers, and/or other devices, components, or elements. Further, some data paths or components of the network (e.g., instances) may be hidden or minimized within user interface 400 to facilitate illustration and/or presentation of components or data paths that are most relevant to a given network analysis.

Options region 408 provides, along the right-hand side of user interface 400, a number of input fields relating to both the underlay network being analyzed (e.g., underlay five-tuple input fields) as well as the overlay network being analyzed (e.g., source and destination virtual network and IP address input fields). User interface 400 accepts input through user interaction with one or more of the displayed input fields, and based on the data entered into the input fields, user interface module 254 presents responsive information about the network being analyzed.

For example, in the example of FIG. 4, user interface 400 accepts input in options region 408 about a specific timeframe (e.g., a time range), a source and destination virtual network, and a source and destination IP address. Underlay information in user interface 400 has not been specified by user input in the example shown. Using the input that has been provided in options region 408, network analysis system 240 determines information about one or more possible data paths (e.g., the most likely data paths) through underlay network devices. Network analysis system 240 determines such possible data paths based on the data collected by network analysis system 240 (e.g., by collector module 252) during a time range specified in options region 408. User interface module 254 of network analysis system 240 generates data enabling the presentation of user interface 400, where one possible data path is highlighted (by drawing each segment of the data path with a wide line) as shown in FIG. 4. In some examples, more than one data path from the source virtual network to the destination virtual network may be highlighted. Further, in some examples, one or more data paths in main display region 406 may be presented using heat map color scheme, meaning that data paths are illustrated with a color (or shade of gray) that corresponds to the amount of data being communicated over the path, or that corresponds to the extent to which the corresponding path is being utilized. Although FIG. 4 illustrates data paths using a heat map color (or gray-scale shading) scheme, in other examples, data about the utilization or traffic on data paths or through network devices can be presented in other appropriate ways (e.g., applying color to other elements of main display region 406, presenting pop-up windows, or presenting other user interface elements).

In some examples, options region 408 (or other areas of user interface 400) may include graphs or other indicators providing information about the utilization or traffic on one or more paths. In such examples, the graphs may be pertinent to, or may be generated in response to, user input entered into the input fields within options region 408.

Figure 5:
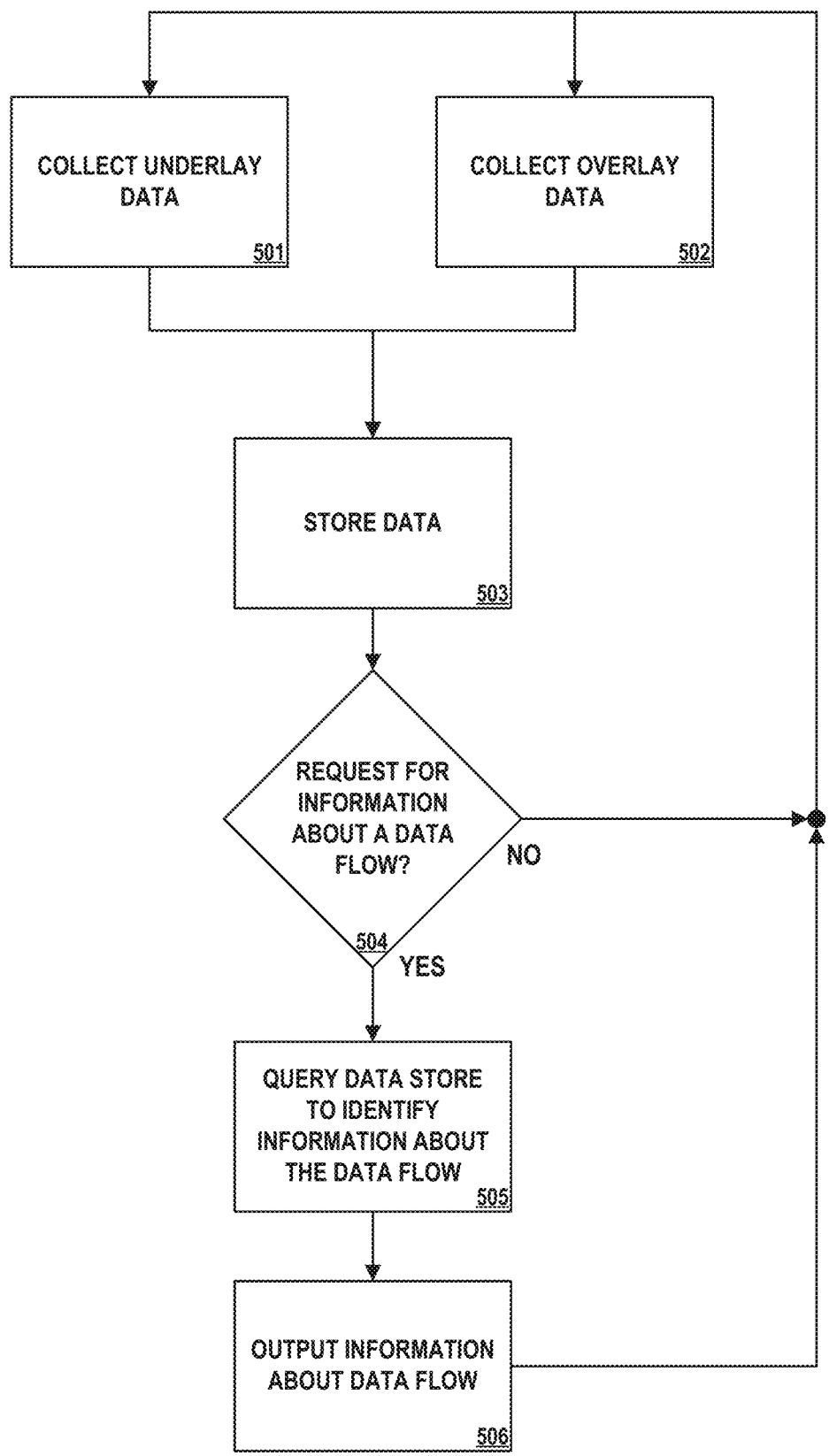
FIG. 5 is a flow diagram illustrating operations performed by an example network analysis system in accordance with one or more aspects of the present disclosure.

FIG. 5 is a flow diagram illustrating operations performed by an example network analysis system in accordance with one or more aspects of the present disclosure. FIG. 5 is described herein within the context of network analysis system 240 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, network analysis system 240 may collect underlay flow data (501) and overlay flow data (502). For example, in FIG. 2, each of spine devices 202 and each of leaf devices 203 output respective signals (e.g., sFlow data) over network 205. Communication unit 215 of network analysis system 240 detects signals that collector module 252 determines include underlay flow data 204. Similarly, virtual router modules 224 within each of host devices 210 output a signal over network 205. Communication unit 215 of network analysis system 240 detects additional signals that collector module 252 determines includes overlay flow data 206. In some examples, collector module 252 may load balance the receipt of the signals across multiple collector modules 252 to ensure that a high volume of signals can be processed without delay and/or without loss of data.

Network analysis system 240 may store underlay flow data and overlay flow data (503). For example, collector module 252 may output information about the collected flow data (e.g., underlay flow data 204 and overlay flow data 206) to data store 259. Data store 259 stores the flow data in indexed format, and in some examples, in a structure that enables fast aggregations queries and/or fast random-access data retrieval.

Network analysis system 240 may receive a request for information about a data flow (YES path from 504). For example, user interface device 129 detects input. In one such example, user interface device 129 outputs a signal over network 205. Communication unit 215 of network analysis system 240 detects a signal that flow API 256 determines corresponds to a request for information from a user of user interface device 129. Alternatively, network analysis system 240 may continue to collect and store underlay flow data 204 and overlay flow data 206 until a request for information about a data flow is received (NO path from 504).

Network analysis system 240 may perform a query to identify information about the data flow (505). For example, when network analysis system 240 receives a request for information, flow API 256 parses the request and identifies information that can be used to perform a query. In some cases, the information may include a source and destination virtual network, and/or a relevant timeframe. In other examples, the information may include other information, such as an underlay source or destination IP address or a source or destination port number. Flow API 256 uses the information included within the request to query data store 259 for information about one or more relevant data flows. Data store 259 processes the query, and outputs, to flow API 256, the identity of one or more network devices used by traffic between the source virtual network and the destination virtual network. In some examples, the identity of the network devices may enable flow API 256 to determine one or more likely data paths traversed by traffic between the source and destination virtual networks.

To determine the identity of network devices used by traffic between the source virtual network and the destination virtual network, flow API 256 may query data store 259 for underlay flow data for network devices that have the same five-tuple data (i.e., source and destination address and port number, and protocol) as the virtual networks or virtual IP addresses specified in the query. Network devices identified in underlay flow data that match the five-tuple data are identified as possible network devices used by traffic between the source virtual network and the destination virtual network. Network analysis system 240 may output information about the data flow (506). For example, again referring to FIG. 2, flow API 256 may output to user interface module 254 information about the data paths determined by flow API 256 in response to the query. User interface module 254 generates information sufficient to present a user interface that includes information about the data flow. User interface module 254 causes communication unit 215 to output a signal over network 205 that includes the information sufficient to present a user interface. In some examples, user interface device 129 receives the signal, parses the information, and presents a user interface that illustrates information about the data flow.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., user interface devices 129, spine devices 202, leaf devices 203, host devices 210, network analysis system 240, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   collecting, by a network analysis system on a network having a plurality of network devices, flow data including underlay flow data and overlay flow data;
   receiving, by the network analysis system, a request for information about a data flow, wherein the request for information specifies a source virtual address for the data flow and further specifies a destination virtual address for the data flow;
   identifying, by the network analysis system and based on the collected flow data, network devices that have processed at least one packet in the data flow, wherein identifying the network devices includes identifying correlations between the underlay flow data and the overlay flow data, and identifying, further based on the correlations, the network devices;
   determining, by the network analysis system and based on the identified network devices, an underlay data path from a source virtual network associated with the source virtual address to a destination virtual network associated with the destination virtual address; and
   outputting, by the network analysis system, information about the underlay data path.

2. The method of claim 1, wherein the request for information about the data flow further includes a timeframe, and wherein identifying the network devices includes:
   determining, based on the timeframe, which of the identified network devices have processed at least one packet in the data flow during the timeframe.

3. The method of claim 2, wherein the underlay flow data includes a plurality of underlay flow records, and wherein identifying the network devices includes:
   correlating overlay flow data with the underlay flow records during the timeframe; and
   adding, to at least some of the underlay flow records, overlay flow data that is correlated with each respective underlay flow record.

4. The method of claim 3, wherein adding overlay flow data includes:
   adding, to at least some of the underlay flow records, source virtual network data from the overlay flow data collected during the timeframe, and
   adding, to at least some of the underlay flow records, destination virtual network data from the overlay flow data collected during the timeframe.

5. The method of claim 1, wherein identifying the network devices includes:
   evaluating the overlay flow data to identify traffic registered by a virtual router; and
   identifying, based on the traffic registered by the virtual router, traffic between one or more virtual machines and one or more network devices.

6. The method of claim 1, wherein identifying the network devices includes:
   identifying network devices that have five-tuple data matching the source virtual address or the destination virtual address.

7. The method of claim 1, wherein the plurality of network devices includes a plurality of host devices, each executing a plurality of virtual computing instances, and wherein collecting flow data includes:
  configuring each of the plurality of network devices to transmit underlay flow data over the network to the network analysis system; and
  configuring each of the host devices to transmit the overlay flow data over the network to the network analysis system.

8. The method of claim 7, wherein configuring each of the host devices to transmit the overlay flow data includes:
  configuring a virtual router executing on each of the host devices to transmit the overlay flow data.

9. The method of claim 7, wherein the network analysis system includes a plurality of flow collector instances, and wherein collecting the flow data includes:
  load balancing collection of the flow data by distributing the flow data across the plurality of flow collector instances.

10. A system comprising a storage system and processing circuitry having access to the storage system, wherein the processing circuitry is configured to:
  collect, on a network having a plurality of network devices, flow data including underlay flow data and overlay flow data;
  receive a request for information about a data flow, wherein the request for information specifies a source virtual address for the data flow and further specifies a destination virtual address for the data flow, and wherein the request for information about the data flow further includes a timeframe;
  identify, based on the collected flow data, network devices that have processed at least one packet in the data flow, wherein to identify the network devices, the processing circuitry is further configured to determine, based on the timeframe, which of the identified network devices have processed at least one packet in the data flow during the timeframe;
  determine, based on the identified network devices, an underlay data path from a source virtual network associated with the source virtual address to a destination virtual network associated with the destination virtual address; and
  output information about the underlay data path.

11. The system of claim 10, wherein to identify the network devices, the processing circuitry is further configured to:
  identify correlations between the underlay flow data and the overlay flow data; and
  identify, further based on the correlations, the network devices.

12. The system of claim 10, wherein the underlay flow data includes a plurality of underlay flow records, and wherein to identify the network devices, the processing circuitry is further configured to:
  correlate overlay flow data with the underlay flow records during the timeframe; and
  add, to at least some of the underlay flow records, overlay flow data that is correlated with each respective underlay flow record.

13. The system of claim 12, wherein to add overlay flow data, the processing circuitry is further configured to:
  add, to at least some of the underlay flow records, source virtual network data from the overlay flow data collected during the timeframe, and
  add, to at least some of the underlay flow records, destination virtual network data from the overlay flow data collected during the timeframe.

14. The system of claim 10, wherein to identify the network devices, the processing circuitry is further configured to:
  evaluate the overlay flow data to identify traffic registered by a virtual router; and
  identify, based on the traffic registered by the virtual router, traffic between one or more virtual machines and one or more network devices.

15. The system of claim 10, wherein to identify the network devices, the processing circuitry is further configured to:
  identify network devices that have five-tuple data matching the source virtual address or the destination virtual address.

16. The system of claim 10, wherein the plurality of network devices includes a plurality of host devices, each executing a plurality of virtual computing instances, and wherein to collect flow data, the processing circuitry is further configured to:
  configure each of the plurality of network devices to transmit underlay flow data over the network to the system; and
  configure each of the host devices to transmit the overlay flow data over the network to the system.

17. The system of claim 16, wherein to configure each of the host devices to transmit the overlay flow data, the processing circuitry is further configured to:
  configure a virtual router executing on each of the host devices to transmit the overlay flow data.

18. Non-transitory computer-readable storage media comprising instructions that, when executed, configure processing circuitry of a computing system to perform operations comprising:
  collect, on a network having a plurality of network devices, flow data including underlay flow data and overlay flow data;
  receive a request for information about a data flow, wherein the request for information specifies a source virtual address for the data flow and further specifies a destination virtual address for the data flow;
  identify, based on the collected flow data, network devices that have processed at least one packet in the data flow, wherein to identify the network devices, the processing circuitry is further configured to evaluate the overlay flow data to identify traffic registered by a virtual router; and identify, based on the traffic registered by the virtual router, traffic between one or more virtual machines and one or more network devices;
  determine, based on the identified network devices, an underlay data path from a source virtual network associated with the source virtual address to a destination virtual network associated with the destination virtual address; and
  output information about the underlay data path.

* * * * *